United States Patent
Cai et al.

(10) Patent No.: US 12,248,898 B2
(45) Date of Patent: Mar. 11, 2025

(54) CONFIRMING SKILLS AND PROFICIENCY IN COURSE OFFERINGS

(71) Applicant: AstrumU, Inc., Kirkland, WA (US)

(72) Inventors: Xiao Cai, Redmond, WA (US); Ujash Suresh Patel, Renton, WA (US); Kaj Orla Peter Pedersen, Bellevue, WA (US); Fedir Skitsko, Kharkov (UA); Adam Jason Wray, Medina, WA (US)

(73) Assignee: AstrumU, Inc., Bellevue, WA (US)

( * ) Notice: Subject to any disclaimer, the term of this patent is extended or adjusted under 35 U.S.C. 154(b) by 0 days.

(21) Appl. No.: 17/587,413

(22) Filed: Jan. 28, 2022

(65) Prior Publication Data
US 2023/0245030 A1    Aug. 3, 2023

(51) Int. Cl.
*G06Q 10/0639* (2023.01)

(52) U.S. Cl.
CPC .............. *G06Q 10/06393* (2013.01)

(58) Field of Classification Search
CPC ......... G06Q 10/06393; G06Q 30/0205; G06N 20/00
See application file for complete search history.

(56) References Cited

U.S. PATENT DOCUMENTS

| | | | |
|---|---|---|---|
| 6,067,535 A | 5/2000 | Hobson et al. | |
| 6,199,062 B1 | 3/2001 | Byrne et al. | |
| 6,606,480 B1 | 8/2003 | Lallier et al. | |
| 8,090,725 B1 | 1/2012 | Cranfill | |
| 8,103,679 B1 | 1/2012 | Cranfill et al. | |
| 8,375,026 B1 | 2/2013 | Elliott et al. | |
| 8,688,694 B2 | 4/2014 | Dexter | |
| 8,943,062 B2 | 1/2015 | Baumgartner et al. | |

(Continued)

FOREIGN PATENT DOCUMENTS

| | | | |
|---|---|---|---|
| KR | 20200140246 A | * | 12/2020 |
| WO | 03054727 A1 | | 7/2003 |
| WO | 2020003325 A1 | | 1/2020 |

OTHER PUBLICATIONS

A. Gugnani, V. K. Reddy Kasireddy and K. Ponnalagu, "Generating Unified Candidate Skill Graph for Career Path Recommendation," 2018 IEEE International Conference on Data Mining Workshops (ICDMW), Singapore, 2018, pp. 328-333, doi: 10.1109/ICDMW.2018.00054. (Year: 2018).*

(Continued)

*Primary Examiner* — Mehmet Yesildag
*Assistant Examiner* — Ayanna Minor
(74) *Attorney, Agent, or Firm* — John W. Branch; Branch Partners PLLC

(57) ABSTRACT

Embodiments are directed to managing courses. Course information for a course may be provided. Skill terms may be determined for the course based on the course information and skill models. Candidate skills may be determined based on the skill terms and a unified skill dictionary such that the skill terms may be mapped to the candidate skills based on the unified skill dictionary. A summary of the course information and the candidate skills may be displayed to a subject matter expert. if the subject matter expert confirms that a candidate skill may be taught by the course, the candidate skill may be associated with a course profile for the course that includes the confirmed candidate skills and proficiency scores for the confirmed skills.

24 Claims, 9 Drawing Sheets

(56) References Cited

U.S. PATENT DOCUMENTS

| | | | |
|---|---|---|---|
| 9,529,863 B1* | 12/2016 | Gindin | G06Q 40/00 |
| 9,535,963 B1 | 1/2017 | Shankar et al. | |
| 9,849,388 B2 | 12/2017 | Cohen et al. | |
| 10,230,701 B2 | 3/2019 | Ullrich et al. | |
| 10,610,792 B2 | 4/2020 | Adekunle et al. | |
| 10,789,755 B2 | 9/2020 | Amer et al. | |
| 11,074,476 B2 | 7/2021 | Wray et al. | |
| 11,074,509 B1 | 7/2021 | Wray et al. | |
| 11,151,673 B1 | 10/2021 | Wray et al. | |
| 11,227,240 B2 | 1/2022 | Cohen et al. | |
| 11,250,721 B2 | 2/2022 | Angel et al. | |
| 11,429,893 B1 | 8/2022 | Tong | |
| 11,494,863 B2 | 11/2022 | Wray et al. | |
| 11,551,681 B1 | 1/2023 | Pandey et al. | |
| 11,580,323 B2 | 2/2023 | Wray et al. | |
| 11,587,190 B1* | 2/2023 | Frischmann | G09B 7/06 |
| 11,847,172 B2 | 12/2023 | Pedersen et al. | |
| 11,854,535 B1 | 12/2023 | Zhang et al. | |
| 11,861,321 B1 | 1/2024 | O'Kelly et al. | |
| 11,922,332 B2 | 3/2024 | Wray et al. | |
| 11,928,607 B2 | 3/2024 | Wray et al. | |
| 2002/0055870 A1 | 5/2002 | Thomas | |
| 2002/0059228 A1 | 5/2002 | McCall et al. | |
| 2004/0236598 A1 | 11/2004 | Thomsen | |
| 2005/0080656 A1 | 4/2005 | Crow et al. | |
| 2005/0239032 A1* | 10/2005 | Hartenberger | G09B 7/00 434/322 |
| 2006/0229896 A1 | 10/2006 | Rosen et al. | |
| 2006/0265436 A1 | 11/2006 | Edmond et al. | |
| 2006/0271421 A1 | 11/2006 | Steneker et al. | |
| 2007/0082324 A1 | 4/2007 | Johnson et al. | |
| 2007/0106811 A1 | 5/2007 | Ryman | |
| 2008/0155588 A1 | 6/2008 | Roberts et al. | |
| 2008/0254423 A1 | 10/2008 | Cohen | |
| 2009/0157619 A1 | 6/2009 | Oates et al. | |
| 2010/0057659 A1 | 3/2010 | Phelon et al. | |
| 2010/0125475 A1 | 5/2010 | Twyman | |
| 2010/0145729 A1 | 6/2010 | Katz | |
| 2011/0177483 A1 | 7/2011 | Needham et al. | |
| 2011/0238591 A1 | 9/2011 | Kerr et al. | |
| 2012/0022906 A1* | 1/2012 | Snyder | G06Q 10/06311 705/7.13 |
| 2012/0196261 A1 | 8/2012 | Kim et al. | |
| 2012/0208166 A1 | 8/2012 | Ernst et al. | |
| 2013/0275446 A1 | 10/2013 | Jain et al. | |
| 2013/0281798 A1 | 10/2013 | Rau et al. | |
| 2013/0291098 A1 | 10/2013 | Chung et al. | |
| 2013/0317377 A1 | 11/2013 | Gupta et al. | |
| 2014/0025427 A1 | 1/2014 | Bastian et al. | |
| 2014/0089219 A1 | 3/2014 | Mathews | |
| 2014/0172732 A1 | 6/2014 | Baladi | |
| 2014/0272889 A1 | 9/2014 | Kulkarni et al. | |
| 2014/0279632 A1 | 9/2014 | Andersen et al. | |
| 2015/0088793 A1 | 3/2015 | Burgess et al. | |
| 2015/0140526 A1 | 5/2015 | Marino et al. | |
| 2015/0242979 A1 | 8/2015 | Abts | |
| 2015/0310393 A1 | 10/2015 | Bhaskaran et al. | |
| 2015/0317754 A1 | 11/2015 | Goel et al. | |
| 2015/0347917 A1 | 12/2015 | Hua et al. | |
| 2015/0379429 A1 | 12/2015 | Lee et al. | |
| 2015/0379454 A1 | 12/2015 | Polli et al. | |
| 2016/0217701 A1 | 7/2016 | Brown et al. | |
| 2016/0293036 A1 | 10/2016 | Niemi et al. | |
| 2016/0352760 A1 | 12/2016 | Mrkos et al. | |
| 2016/0379170 A1 | 12/2016 | Pande | |
| 2017/0024701 A1 | 1/2017 | Tang et al. | |
| 2017/0061817 A1 | 3/2017 | Mettler May | |
| 2017/0076244 A1 | 3/2017 | Bastide et al. | |
| 2017/0109448 A1 | 4/2017 | Adamy et al. | |
| 2017/0213179 A1 | 7/2017 | Schissel et al. | |
| 2017/0213190 A1 | 7/2017 | Hazan | |
| 2017/0243163 A1 | 8/2017 | Vootkur | |
| 2017/0293841 A1 | 10/2017 | McAllister et al. | |
| 2017/0323211 A1 | 11/2017 | Bencke et al. | |
| 2017/0323233 A1 | 11/2017 | Bencke et al. | |
| 2018/0039946 A1 | 2/2018 | Bolte et al. | |
| 2018/0046623 A1 | 2/2018 | Faith et al. | |
| 2018/0144253 A1 | 5/2018 | Merhav et al. | |
| 2018/0157995 A1 | 6/2018 | O'Malley | |
| 2018/0225593 A1 | 8/2018 | Cozine et al. | |
| 2018/0247549 A1 | 8/2018 | Martin et al. | |
| 2018/0293327 A1 | 10/2018 | Miller et al. | |
| 2018/0300755 A1 | 10/2018 | Rohilla et al. | |
| 2018/0357608 A1 | 12/2018 | Agrawal et al. | |
| 2019/0009133 A1 | 1/2019 | Mettler May | |
| 2019/0102700 A1* | 4/2019 | Babu | G06N 20/00 |
| 2019/0108217 A1 | 4/2019 | Chen | |
| 2019/0122161 A1 | 4/2019 | Cicio, Jr. | |
| 2019/0151758 A1 | 5/2019 | Anglin et al. | |
| 2019/0180098 A1 | 6/2019 | Carpenter et al. | |
| 2019/0251477 A1 | 8/2019 | Crosta et al. | |
| 2019/0279159 A1 | 9/2019 | Cleaver et al. | |
| 2019/0378050 A1 | 12/2019 | Edkin et al. | |
| 2020/0051460 A1 | 2/2020 | Bedor et al. | |
| 2020/0125928 A1 | 4/2020 | Doyle | |
| 2020/0211041 A1 | 7/2020 | Raudies et al. | |
| 2020/0302296 A1 | 9/2020 | Miller | |
| 2020/0320371 A1 | 10/2020 | Baker | |
| 2020/0394592 A1 | 12/2020 | Shi et al. | |
| 2021/0158074 A1 | 5/2021 | Wray et al. | |
| 2021/0256310 A1 | 8/2021 | Roberts et al. | |
| 2021/0279668 A1 | 9/2021 | Mikhajlov | |
| 2021/0334921 A1* | 10/2021 | Austin | G06Q 10/063112 |
| 2021/0350167 A1 | 11/2021 | Wray et al. | |
| 2021/0406298 A1 | 12/2021 | Rudden et al. | |
| 2022/0028020 A1 | 1/2022 | Wray et al. | |
| 2022/0076187 A1* | 3/2022 | Blum | G06N 5/04 |
| 2022/0138600 A1 | 5/2022 | Wray et al. | |
| 2022/0156866 A1 | 5/2022 | Dua et al. | |
| 2022/0245487 A1 | 8/2022 | Shen et al. | |
| 2022/0374703 A1 | 11/2022 | Rigotti et al. | |
| 2022/0375015 A1 | 11/2022 | Botteril et al. | |
| 2022/0391725 A1 | 12/2022 | Wray et al. | |
| 2023/0039710 A1 | 2/2023 | Moore et al. | |
| 2023/0259705 A1 | 8/2023 | Tunstall-Pedoe et al. | |
| 2023/0297908 A1 | 9/2023 | Jagadeesan et al. | |
| 2023/0350952 A1 | 11/2023 | Pedersen et al. | |

OTHER PUBLICATIONS

Office Communication for U.S. Appl. No. 16/691,479 mailed Mar. 2, 2020, pp. 1-22.

Office Communication for U.S. Appl. No. 16/691,479 mailed Jun. 25, 2020, pp. 1-26.

Office Communication for U.S. Appl. No. 16/898,177 mailed Jul. 22, 2020, pp. 1-12.

Office Communication for U.S. Appl. No. 16/691,479 mailed Sep. 11, 2020, pp. 1-6.

Office Communication for U.S. Appl. No. 16/898,177 mailed Nov. 2, 2020, pp. 1-13.

Office Communication for U.S. Appl. No. 16/898,177 mailed Feb. 2, 2021, pp. 1-5.

Office Communication for U.S. Appl. No. 17/107,760 mailed Feb. 8, 2021, pp. 1-35.

Office Communication for U.S. Appl. No. 16/691,479 mailed Feb. 19, 2021, pp. 1-26.

Office Communication for U.S. Appl. No. 16/898,177 mailed Feb. 23, 2021, pp. 1-9.

Office Communication for U.S. Appl. No. 17/107,760 mailed May 20, 2021, pp. 1-8.

Office Communication for U.S. Appl. No. 16/691,479 mailed Jun. 10, 2021, pp. 1-36.

Office Communication for U.S. Appl. No. 16/898,177 mailed Jun. 18, 2021, pp. 1-11.

Office Communication for U.S. Appl. No. 16/898,177 mailed Sep. 1, 2021, pp. 1-16.

Office Communication for U.S. Appl. No. 17/385,054 mailed Nov. 19, 2021, pp. 1-41.

Office Communication for U.S. Appl. No. 17/384,577 mailed Nov. 26, 2021, pp. 1-31.

(56) References Cited

OTHER PUBLICATIONS

Office Communication for U.S. Appl. No. 17/492,527 mailed Jan. 18, 2022, pp. 1-11.
Patel, Kayur et al., "Using Multiple Models to Understand Data," In Proceedings of the Twenty-Second International Joint Conference on Artificial Intelligence—vol. Two (IJCAP'11), AAAI Press, Jul. 2011, 1723-1728.
Ludwigsen, Scott, "What Is Localization, and When Do You Need It?," Feb. 21, 2018, retrieved at: https://blog.languageline.com/what-is-localization, pp. 1-5.
Dillenberger, Donna N. et al., "Blockchain Analytics and Artificial Intelligence," IBM Journal of Research and Development, 2019, pp. 1-13.
"More Than 80 New Products Will be Showcased at Next Week's HR Technology Conference & Exposition®," NoticiasFinancieras, Miami, Oct. 2017, pp. 1-7.
Office Communication for U.S. Appl. No. 17/384,577 mailed Mar. 22, 2022, pp. 1-32.
Office Communication for U.S. Appl. No. 17/385,054 mailed Mar. 28, 2022, pp. 1-43.
Office Communication for U.S. Appl. No. 17/492,527 mailed Apr. 29, 2022, pp. 1-12.
Office Communication for U.S. Appl. No. 17/384,577 mailed Jun. 13, 2022, pp. 1-5.
Office Communication for U.S. Appl. No. 17/385,054 mailed Jun. 20, 2022, pp. 1-5.
Office Communication for U.S. Appl. No. 17/384,577 mailed Jul. 11, 2022, pp. 1-31.
Office Communication for U.S. Appl. No. 17/492,527 mailed Jul. 15, 2022, pp. 1-9.
Office Communication for U.S. Appl. No. 17/732,768 mailed Jul. 21, 2022, pp. 1-44.
Office Communication for U.S. Appl. No. 17/385,054 mailed Oct. 18, 2022, pp. 1-48.
Yanes, Nacim et al., "A Machine Learning-Based Recommender System for Improving Students Learning Experiences," IEEE Access, Nov. 2020, vol. 8, pp. 201218-201235.
Alshanqiti, Abdullah et al., "Predicting Student Performance and Its Influential Factors Using Hybrid Regression and Multi-Label Classification," IEEE Access, Nov. 2020, vol. 8, pp. 203827-203844.
Gonzalez, Avelino J. et al., "Automated Exercise Progression in Simulation-Based Training," IEEE Transactions on Systems, Man, and Cybernetics, Jun. 1994, vol. 24, No. 6, pp. 863-874.
Office Communication for U.S. Appl. No. 17/888,920 mailed Nov. 16, 2022, pp. 1-22.
Office Communication for U.S. Appl. No. 17/384,577 mailed Nov. 25, 2022, pp. 1-29.
Office Communication for U.S. Appl. No. 17/732,768 mailed Nov. 30, 2022, pp. 1-48.
Office Communication for U.S. Appl. No. 17/385,054 mailed Jan. 30, 2023, pp. 1-13.
Office Communication for U.S. Appl. No. 17/732,768 mailed Feb. 13, 2023, pp. 1-4.
Office Communication for U.S. Appl. No. 17/888,920 mailed Mar. 10, 2023, pp. 1-24.
Office Communication for U.S. Appl. No. 17/732,768 mailed Mar. 22, 2023, pp. 1-52.
Office Communication for U.S. Appl. No. 17/385,054 mailed Apr. 6, 2023, pp. 1-4.
Office Communication for U.S. Appl. No. 18/091,698 mailed Apr. 20, 2023, pp. 1-47.
Office Communication for U.S. Appl. No. 17/888,920 mailed May 16, 2023, pp. 1-4.
Office Communication for U.S. Appl. No. 17/385,054 mailed Jul. 20, 2023, 12 Pages.
Office Communication for U.S. Appl. No. 17/732,768 mailed Jul. 14, 2023, 52 Pages.
Office Communication for U.S. Appl. No. 17/732,768 mailed Oct. 13, 2023, 9 Pages.
Office Communication for U.S. Appl. No. 17/888,920 mailed Sep. 14, 2023, 24 Pages.
Office Communication for U.S. Appl. No. 18/091,698 mailed Aug. 31, 2023, 53 Pages.
Office Communication for U.S. Appl. No. 18/216,025 mailed Sep. 6, 2023, 14 Pages.
Office Communication for U.S. Appl. No. 18/216,025 mailed Apr. 12, 2024, 13 Pages.
Office Communication for U.S. Appl. No. 18/486,498 mailed Mar. 14, 2024, 16 Pages.
Office Communication for U.S. Appl. No. 18/486,498 mailed May 6, 2024, 04 Pages.
Office Communication for U.S. Appl. No. 18/486,498 mailed Jun. 18, 2024, 14 Pages.
"The big jobs debate: who's at risk from GenAI?" Mint, New Delhi, Aug. 13, 2023, 3 pages.
Office Communication for U.S. Appl. No. 17/385,054 mailed Nov. 6, 2023, 5 Pages.
Office Communication for U.S. Appl. No. 17/385,054 mailed Nov. 15, 2023, 2 Pages.
Office Communication for U.S. Appl. No. 18/091,698 mailed Nov. 15, 2023, 5 Pages.
Office Communication for U.S. Appl. No. 17/888,920 mailed Jan. 11, 2024, 5 Pages.
Office Communication for U.S. Appl. No. 18/216,025 mailed Dec. 22, 2023, 15 Pages.
Office Communication for U.S. Appl. No. 17/888,920 mailed Jan. 23, 2024, 2 Pages.
Office Communication for U.S. Appl. No. 18/091,698 mailed Feb. 1, 2024, 58 Pages.
Office Communication for U.S. Appl. No. 18/216,025 mailed Jan. 30, 2024, 4 Pages.
Office Communication for U.S. Appl. No. 18/486,498 mailed Jan. 18, 2024, 15 Pages.

\* cited by examiner

CONFIRMING SKILLS AND PROFICIENCY IN COURSE OFFERINGS

TECHNICAL FIELD

The present invention relates generally to data management, and more particularly, but not exclusively, to managing data for confirming skills and proficiency in course offerings.

BACKGROUND

Modern computing often requires the collection, processing, or storage of large data sets that may be used for training or tuning various machine learning applications. Conventionally machine learning systems may require large volumes of results or test results to be labeled or scored by persons to train, tune, or evaluate various machine learning systems that may be employed by applications. In some cases, the machine learning application may employ untrained or non-professional persons to perform results labeling/scoring. Accordingly, organizations may often draw from a large population of non-professionals to affordably or efficiently label or score predictions, selections, classifications, or the like, produced by machine learning systems. However, in some cases, or some applications, persons having subject matter expertise (professionals) may be required for labeling, tagging, or scoring results produced by machine learning systems. In such cases, it may difficult or expensive to find persons willing or able to perform the necessary labeling or scoring of machine learning results absent tools or processes that may reduce the time or effort required for professionals to label or score machine learning results. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
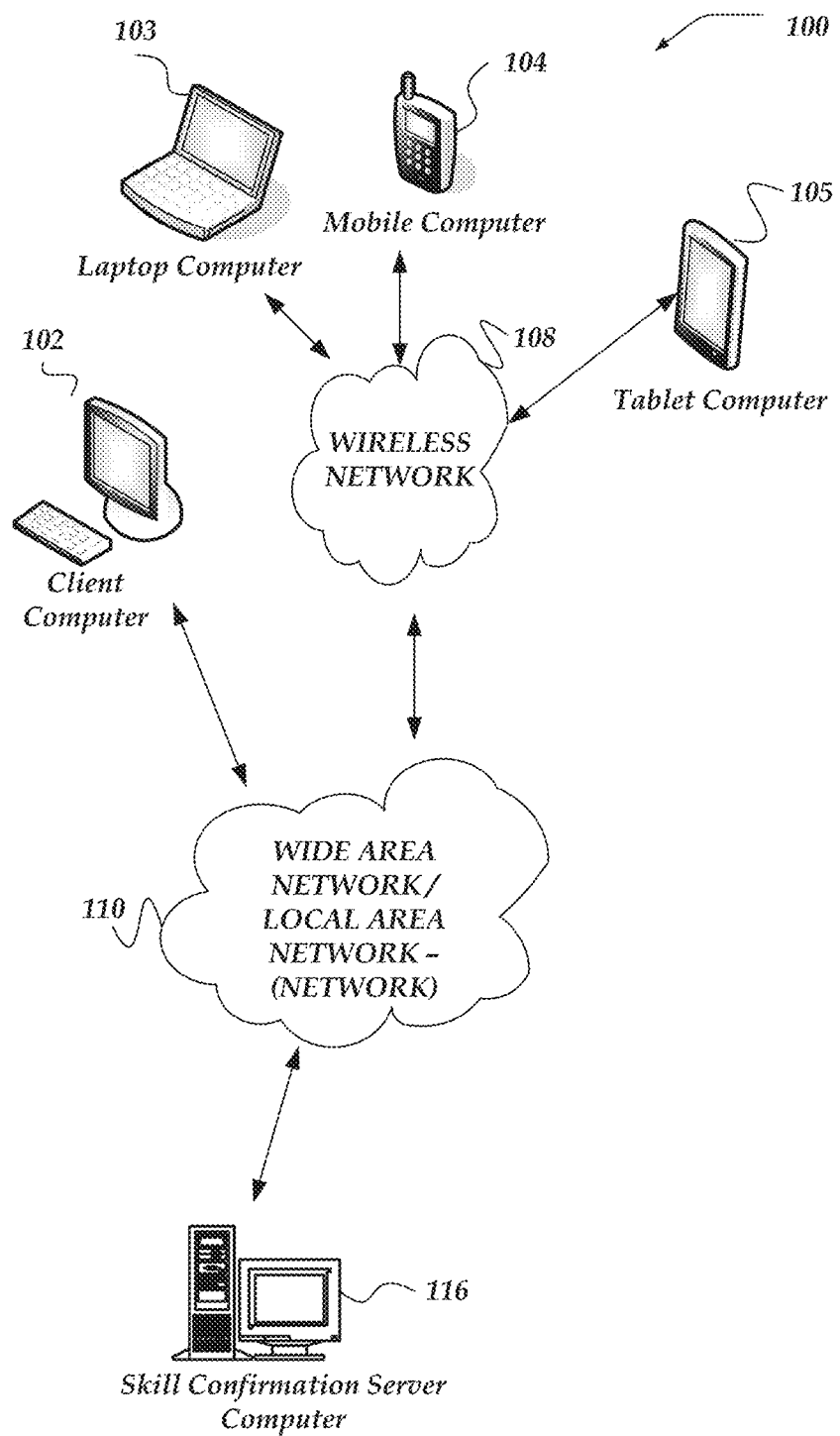
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances, data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a data ingestion platform.

As used herein the term "unified skill dictionary" refers a collection of skill labels or skill definitions that may be used across institutions or industries. In some cases, the skill labels/definitions may be derived from private or public sources, including government classifications, industry standards, industry conventions, local preferences, or the like.

As used herein the term "skill model" refers one or more data structures that encapsulate the data, rules, machine learning models, machine learning classifiers, or instructions that may be employed to determine skill terms that may be included in raw course information assets and map them to skills in a unified skill dictionary. Skill models may include various components, such as, one or more machine learning based classifiers, heuristics, rules, pattern matching, conditions, or the like, that may be employed to map terms in raw course information assets to a unified skill dictionary. Skill models may be trained, tuned, or configured absent the need for scorers. E.g., conventional machine learning training/testing may be employed to machine learning based skill models.

As used herein the term "course profile" refers to one or more data structures or records gathered together to provide information about a course. For example, a course profile may include (or reference) various course information, candidate skills, confirmed skills, scorer history, or the like.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing courses. In one or more of the various embodiments, course information for a course may be provided based on one or more of a course syllabus, a course catalog, or a course description.

In one or more of the various embodiments, one or more skill terms may be determined for the course based on the course information and one or more skill models.

In one or more of the various embodiments, one or more candidate skills may be determined based on the one or more skill terms and a unified skill dictionary such that the one or more skill terms may be mapped to the one or more candidate skills based on the unified skill dictionary.

In one or more of the various embodiments, a summary of the course information and the one or more candidate skills may be displayed to a subject matter expert.

In one or more of the various embodiments, in response to the subject matter expert confirming that a candidate skill may be taught by the course further actions may be performed, including: determining a proficiency score for the confirmed candidate skill based on the subject matter expert; and generating a course profile for the course that includes the confirmed candidate skills and the determined proficiency scores.

In one or more of the various embodiments, in response to the subject matter expert confirming that the candidate skill may be omitted from the course, disassociating the omitted candidate skill from the course.

In one or more of the various embodiments, a report based on the course profile may be generated such that the report includes one or more confirmed skills and a proficiency score for each confirmed skill.

In one or more of the various embodiments, determining the proficiency score may include: determining a range of values based on a classification of educational learning objectives into levels of complexity and specificity; employing a user interface to display the range of values to the subject matter expert; and determining the proficiency score based on a value selected by the subject matter expert. In one or more of the various embodiments, the range of values may be based on Bloom's Taxonomy.

In one or more of the various embodiments, determining the one or more candidate skills may include: determining one or more soft skills based on the one or more skill terms, wherein the one or more soft skills are associated with one or more of communication, collaboration, leadership, problem solving, public speaking, listening, social skills, negotiation, or the like; determining one or more hard skills based on the one or more skill terms such that the one or more hard skills may be associated with one or more of an engineering discipline, a data science discipline, a computer science discipline, a health care discipline, a business administration discipline, a sales or marketing discipline, a finance industry discipline, or the like; and, in some embodiments, displaying the one or more candidate skills in a user interface as a group of the one or more soft skills and another group of the one or more hard skills.

In one or more of the various embodiments, a user interface that enables the subject matter expert to declare one or more additional skills taught by the course may be provided. And, in some embodiments, the one or more additional skills may be included in the course profile.

In one or more of the various embodiments, a plurality of courses and a plurality of course information may be provided based on course offerings corresponding to an educational organization. And, in some embodiments, one or more courses may be assigned to one or more subject matter experts based on an assigned subject matter expert having prior experience teaching the one or more courses.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, skill confirmation server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, skill confirmation server computer 116, or other computers.

Client computers 102-105 may further be configured to include a client application that enables an end-user to log into an end-user account that may be managed by another computer, such as skill confirmation server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by skill confirmation server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, skill confirmation server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of skill confirmation server computer 116 is described in more detail below in conjunction with FIG. 3. Although FIG. 1 illustrates skill confirmation server computer 116, or the like, each as a single computer, the innovations or embodiments are not so limited. For example, one or more functions of skill confirmation server computer 116, or the like, may be distributed across one or more distinct network computers. Moreover, in one or more embodiments, skill confirmation server computer 116 may be implemented using a plurality of network computers. Further, in one or more of the various embodiments, skill confirmation server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
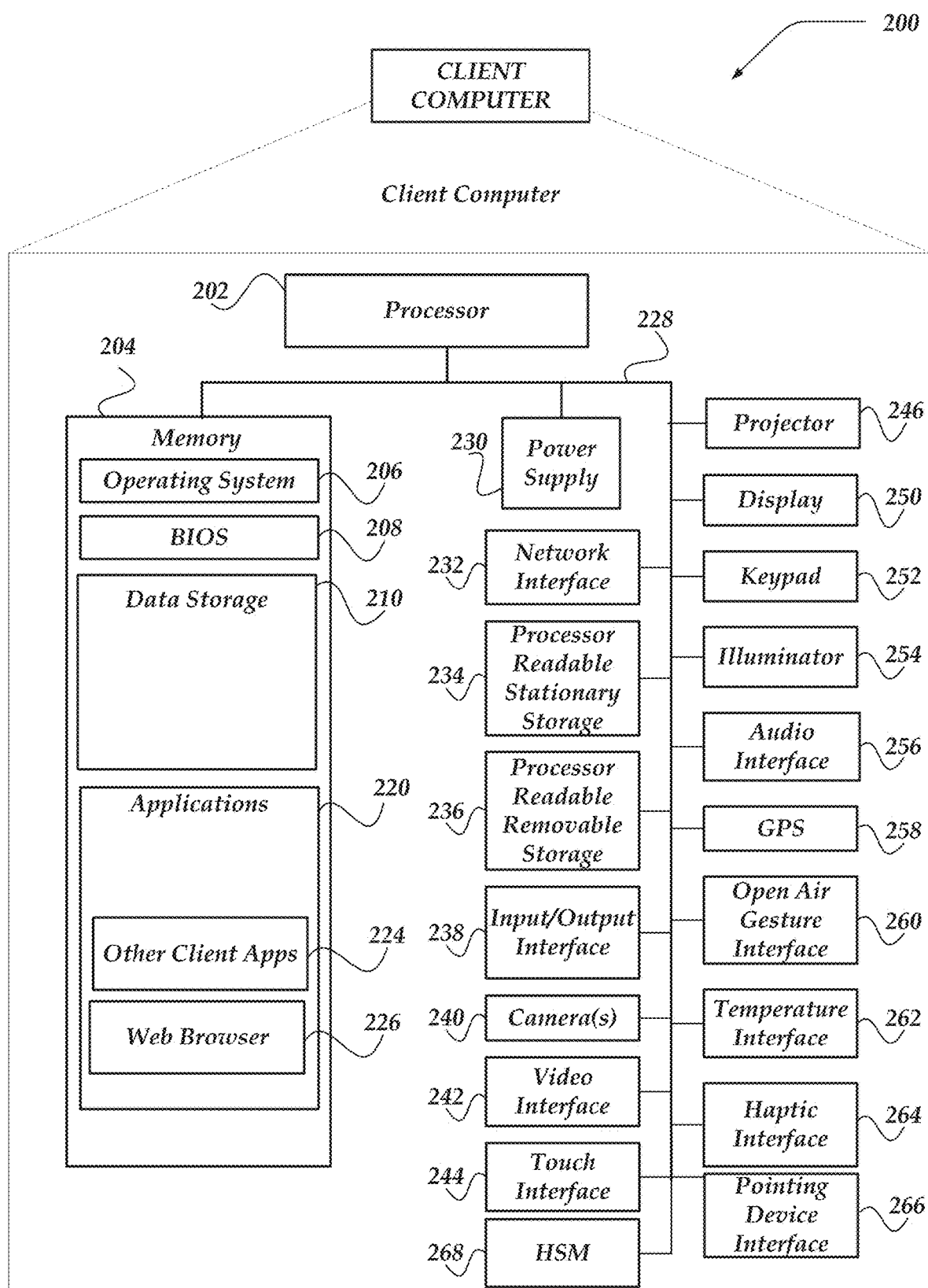
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
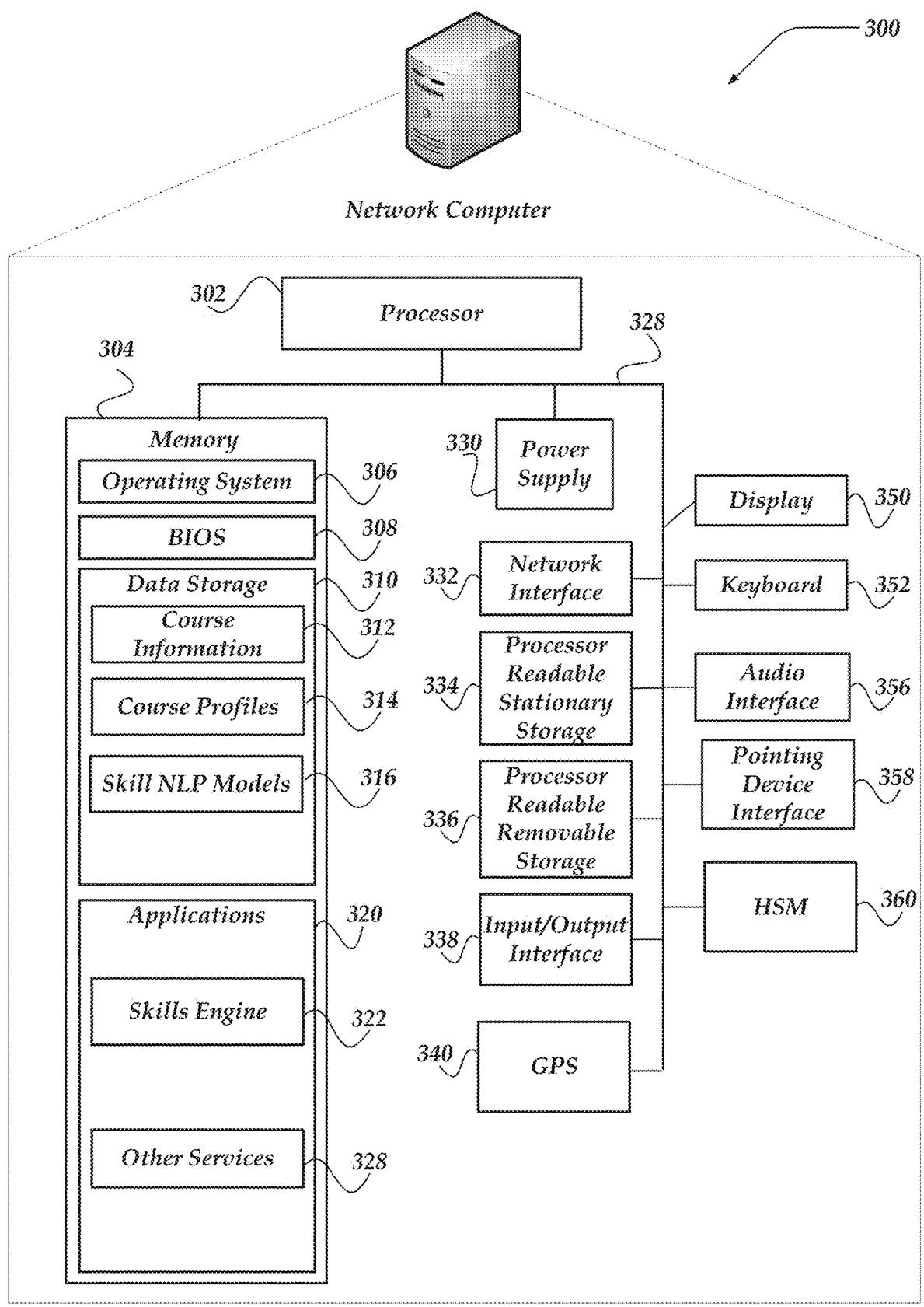
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a skill confirmation management server computer such as skill confirmation server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, skills engine 322, other services 328, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's MacOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, course information 312, course profiles 314, natural language processing models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include skills engine 322, other services 328, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, skills engine 322, other services 328, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to skills engine 322, other services 328, or the like, may be provisioned and de-commissioned automatically.

Also, in one or more of the various embodiments, skills engine 322, other services 328, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
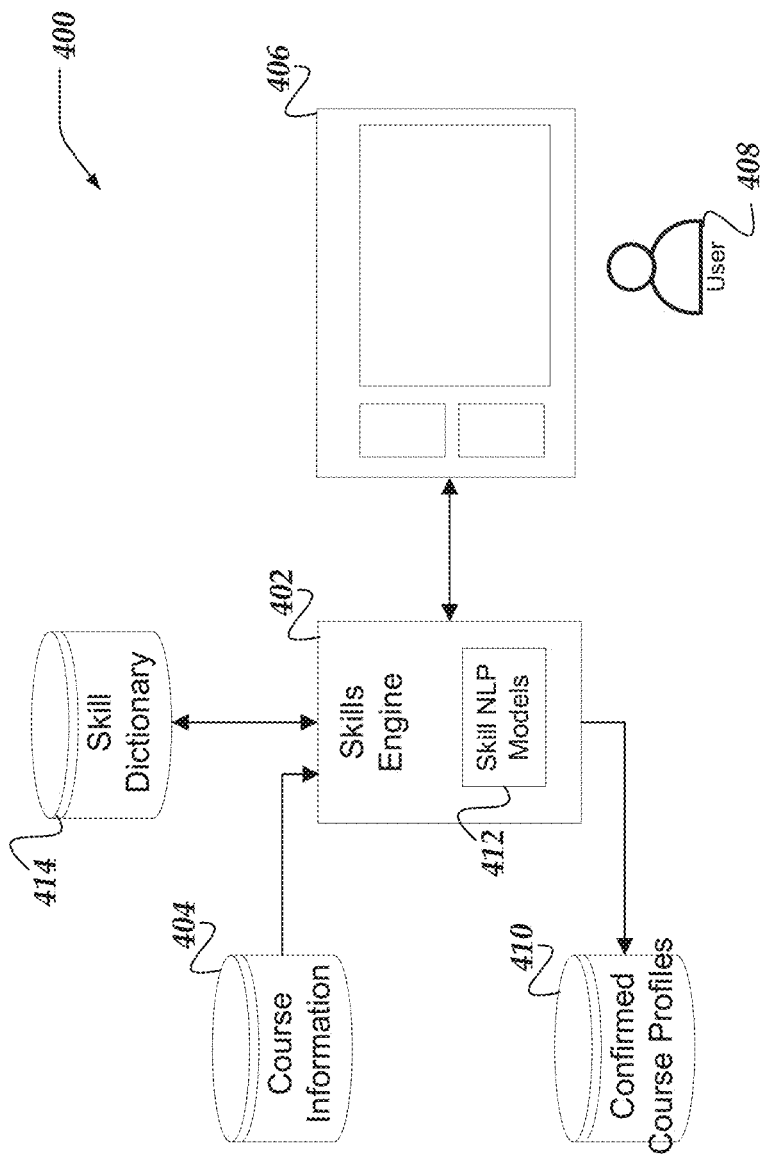
FIG. 4 illustrates a logical architecture of a system for confirming skills and proficiency in course offerings in accordance with one or more of the various embodiments.

FIG. 4 illustrates a logical architecture of system 400 for confirming skills and proficiency in course offerings in accordance with one or more of the various embodiments.

In some cases, it may be advantageous for educational institutions to determine the skills and skill proficiency that may be learned or taught by courses offered by the institutions. Also, it may be advantageous for educational organizations, government agencies, or the like, to compare different courses, skills, skill proficiency, or the like, across educational organizations. Likewise, in some cases, it may be advantageous for students or others to evaluate courses, courses of study, institutions, or the like, based on the skills and skill proficiencies that may be learned from particular courses.

Accordingly, in some embodiments, skills engines may be arranged to provide a normalized/standard representation of the skills and skill proficiencies of courses taught by institutions. Conventionally, institutions may provide lists or summaries or skill and proficiencies for various courses. However, often such lists or summaries may comprise non-standard skill definitions, arbitrary skill proficiencies, or the like. Likewise, there may be mismatches between skill summaries and the actual teaching/learning that may occur in specific courses.

Also, in some cases, in additional to providing unreliable signals, skill lists/summaries for various courses or institutions may be unavailable, aspirational, or out-of-date.

In some cases, students or others may employ course information such as syllabuses, course catalog descriptions, or the like, to evaluate skill or skill proficiencies that may be learned from various courses. However, in some cases, determining skill and skill proficiencies from course information may be disadvantageous for one or more reasons, including lack of standardization within or across institutions, mismatches in the course information and the actual course, or the like.

In some cases, institutions may survey subject matter experts, such as, professors, lecturers, teaching assistants, or the like, to obtain information about the skills and skill proficiencies for various courses. However, collecting accurate information may remain elusive for various reasons, such as: lack of standardization; resistance/unavailability of subject matter experts to evaluate courses; or the like.

Accordingly, in some embodiments, skills engines may be arranged to automatically process course information to identify one or more candidate skills that may be confirmed and scored by subject matter experts.

In one or more of the various embodiments, system 400 may be arranged to include one or more of skills engine 402, course information data store 404, skills user interface 406, confirmed course profiles data store 410, natural language processing models 412, unified skill dictionary 414, or the like.

In one or more of the various embodiments, skills engines, such as, skills engine 402 may be arranged to determine one or more candidate skills that may be taught in courses based on course information associated with a course. In some embodiments, course information may include information, such as, course syllabuses, course catalogs, course descriptions, or the like. In some embodiments, course information may be collected from one or more sources and stored in a course information data store, such as, configuration information data store 404.

In one or more of the various embodiments, skills engines may be arranged to employ natural language processing to identify skills associated with course from the text included in the course information. Accordingly, in some embodiments, skills engines may be arranged to employ one or more natural language processing (NLP) models, such as, NLP models 412 to identify one or more candidate skills from text in the course information.

In one or more of the various embodiments, NLP models may be trained to recognize terms or phrases included in course information and map them to a dictionary of skills. For brevity and clarity, such terms or phrases may be referred to as skill terms. In some embodiments, NLP models may be conventionally trained to map skill terms to skills. In some embodiments, NLP models may be arranged to multiple skill terms to the same skill. Also, in some embodiments, unified skill dictionaries, such as, skill dictionary 414 may include one or more overlapping skills such that the same skill terms may map to more than one skill. Likewise, in some embodiments, skill dictionaries may include one or more skills that may be hierarchical such that broader skills may encompass one or more narrower skills. For example, a broad skill such as 'programming' may be associated with one or more narrower skills such as 'java programming', 'python programming', or the like. In some embodiments, skills may be selected from one or more ontologies associated with various industries or subject matter domains. Also, in some embodiments, skill dictionaries may be populated using custom skill names of skill definitions. Accordingly, in some embodiments, skill dictionaries may be modified using configuration information, or the like, to account for local circumstances or local requirements.

In one or more of the various embodiments, skill engines may employ NLP models to efficiently map skill terms from course information to skills. However, in some cases, skills derived from course information may be different than the skills that may be taught in the actual course. For example, a syllabus may indicate that skill A is taught but in practice that skill may not be taught.

Likewise, in some embodiments, determining skills from course information may be deficient at determining the level of proficiency of the skills that may be learned from the course. For example, courses taught at different institutions (or different courses within the same institution) may teach the same skills but to different proficiencies. Thus, even if skill engines may determine skills in a course from the corresponding course information, determining the proficiency level of those skills may be imprecise or impossible.

Thus, in some embodiments, the skills automatically determined from course information may be considered candidate skills.

Accordingly, in one or more of the various embodiments, skills engines may be arranged to generate user interfaces, such as, skill user interface 406 that enable users, such as, user 408 to confirm if the one or more candidate skills are taught in a course. Also, in some embodiments, skill user interfaces may be arranged to enable qualified users to declare a proficiency score/level for each confirmed score.

For example, in some embodiments, a skill engine may determine four candidate skills for a given course. The determined candidate skills may be presented to qualified user that may confirm or deny that the four skills are taught and at what proficiency. Also, in some embodiments, skills engines may be arranged to generate user interfaces that enable qualified users to declare one or more additional skills that may not have been included in the candidate skills. For brevity and clarity, the qualified users may be referred to as scorers.

In one or more of the various embodiments, skill engines may be arranged to generate a course profile that includes the confirmed skills and the declared proficiencies for the courses. Accordingly, in some embodiments, the course profiles may definitively indicate the skills that are taught by the course and the proficiency level for each taught course. In some embodiments, confirmed course profiles may be provided to other systems or services for recommending courses to students or evaluating the skill learned by students. Also, in some embodiments, confirmed course profiles may be used to compare skills for the 'same' course across or within institutions.

Figure 5:
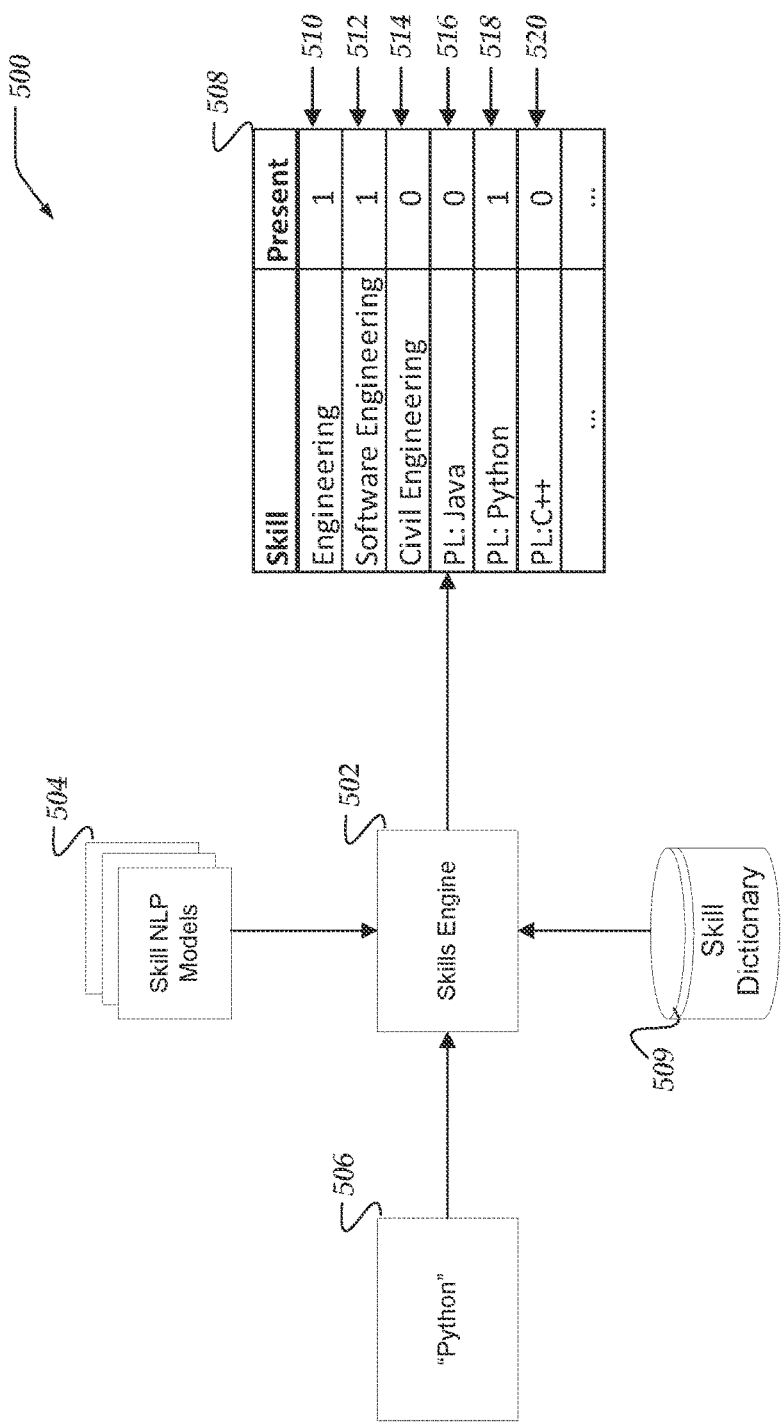
FIG. 5 illustrates a logical representation of a system for confirming skills and proficiency in course offerings in accordance with one or more of the various embodiments.

FIG. 5 illustrates a logical representation of system 500 for confirming skills and proficiency in course offerings in accordance with one or more of the various embodiments. In one or more of the various embodiments, skills engines, such as skills engine 502 may be arranged to map skill terms discovered from course information to skills included in various skill vectors that may be included in course profiles (not shown). In one or more of the various embodiments, skills engines may be arranged to map one skill terms to one or more one skill elements in skill vectors.

In one or more of the various embodiments, one or more skills in the same skill vector may overlap. In some embodiments, one or more skills may have hierarchical relationship with one or more other skills. In some embodiments, one or more skills may be broader in scope or more general than other skills. In some embodiments, one or more broader skills may be matched by related specific skills.

In this example, skills engine 502 may be arranged to employ skill models 504 and skill dictionary 509 to map skill term 506 to skill vector 508. In this example, the value of skill topic 506 is "python," representing a skill of programming with the python programming language. For example, in one or more of the various embodiments, skills engines may have determined that a course may be offering to teach python programming based on parsing text in relevant course information.

Accordingly, in some embodiments, skills engine 502 may be arranged to add skills to skill vector 508 that may be associated with having a skill of python programming. In this example, skills engine 502 may employ skill models 504 to determine three skills to include in skill vector 508 for the course. Namely, in this example, engineering skill 510, software engineering skill 512, and programming language: python skill 518.

Thus, in this example, a course that is determined to teach the python programming will also be assigned a skill of engineering skill 510 (the broadest), software engineering skill 512, and programming language:python skill 518. In contrast, in some embodiments, the skill term python would not assign civil engineering skill 514 to the course. Note, in some embodiments, other skill terms for the course, such as, surveying, structural engineering, soil engineering, or the like, may be discovered independently of the python skill term, causing a skills engine to assign a civil engineering skill to the course corresponding to skill vector 508.

Likewise, in this example, while a skill of python indicates that a course may teach has software engineering skill 512, it does not indicate that the course teaches programming language: Java skill 516 or programming language: C++520, though other skill terms included in the relevant course information may do so.

Note, one of ordinary skill in the art will appreciate that skill vectors may include more or different skills than shown here. In some embodiments, the skill included in skill vectors may evolve as new skill models, or the like, may be developed. Likewise, one or more skills that were favored previously may be determined to be less valuable later for providing useful guidance, predictions, or comparisons. In some embodiments, ongoing machine-learning training of models as well as user feedback may influence the identification of skill terms or if they may be added to skill vectors.

Figure 6:
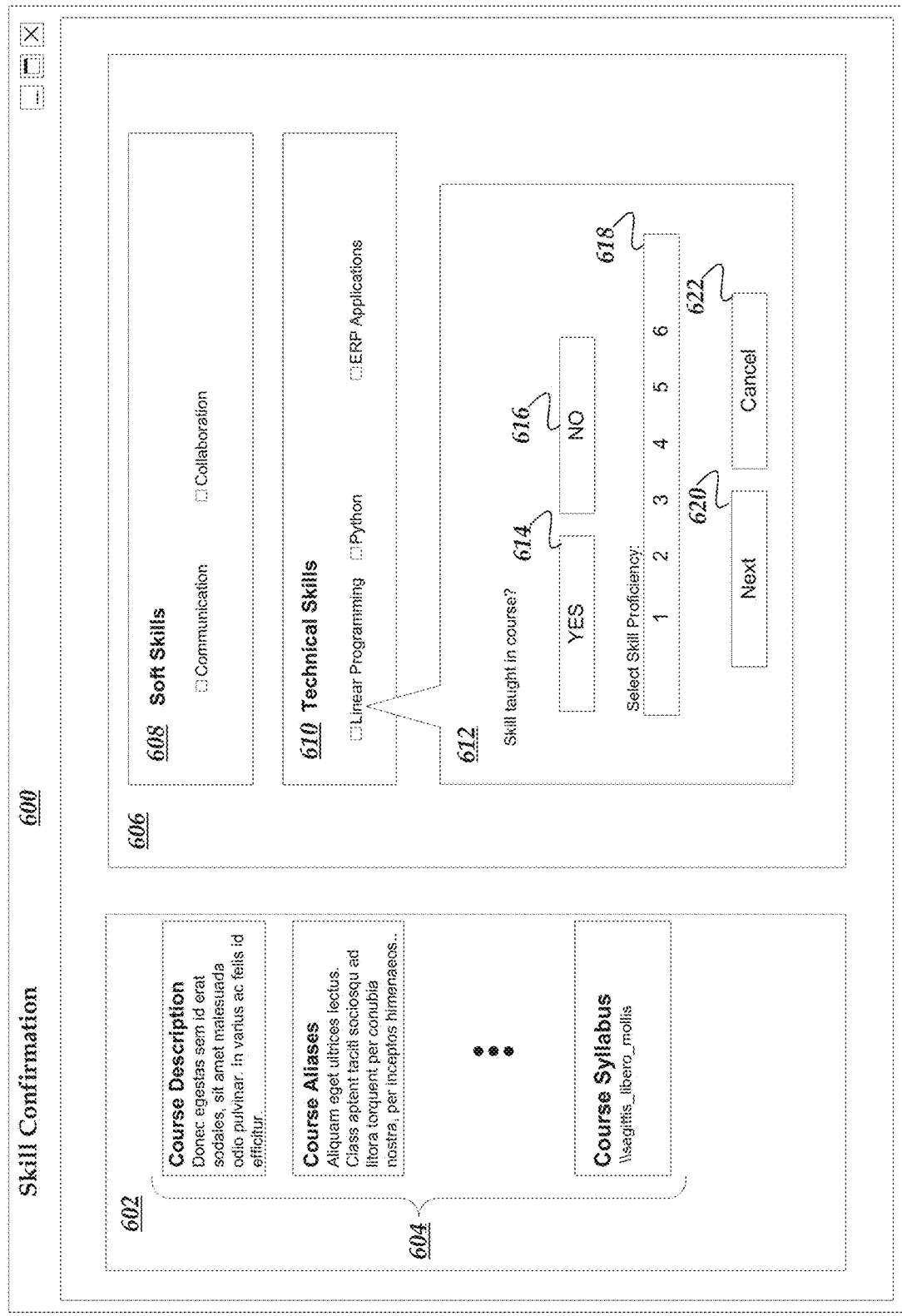
FIG. 6 illustrates a logical schematic of a user interface for confirming skills and proficiency in course offerings in accordance with one or more of the various embodiments.

FIG. 6 illustrates a logical schematic of user interface 600 for confirming skills and proficiency in course offerings in accordance with one or more of the various embodiments. As described above, skills engines may be arranged to generate user interfaces that enable qualified users to confirm skills and skill proficiency for courses. In some embodiments, user interface 600 may be arranged to include information panel 602 that may include information about the particular course being evaluated. Accordingly, in some embodiments, information panels, such as, information panel 602 may include various blocks of information, such as, information blocks 604 that may be relevant to the qualified user (the scorer). In some embodiments, information blocks 604 may include one or more of course titles, course descriptions, course aliases, links to the source of course information (e.g., link to syllabus), or the like.

In some embodiments, user interface 600 may include one or more display panels, such as, display panel 606 that show one or more candidate skills that skills engines may have determined for the course. In some embodiments, unified skill dictionaries may be configured to associate categories with skills. In some embodiments, the particular categories may vary depending on the subject matter domain or application. Accordingly, user interfaces may be configured to group or arrange candidate skills based on the category they may be associated with. In this example, for some embodiments, the candidate skills are categorized into soft skills or technical skills. Thus, in this example, sub-panel 608 includes user interfaces for confirming skills categorized as soft skills. And sub-panel 610 includes user interfaces for confirming skills categorized as technical skills.

In one or more of the various embodiments, user interfaces, such as, user interface 600 may be arranged to display a dialog box, such as dialog box 612 if a user selects a candidate skill from the one or more sub-panels. In some embodiments, dialog boxes, such as, dialog box 612 may be arranged to display various user interface controls that enable a user to confirm or deny that a course teaches the selected candidate skill. In this example, dialog box 612 includes yes button 614, no button 616, skill proficiency selector 618, next button 620, cancel button 622, or the like. Accordingly, in this example, if a user selects yes button 614 for a candidate skill, that skill may be considered a confirmed skill for the course and no longer a candidate skill for the course. Similarly, in this example, if the user selected no button 616 for a candidate skill, that skill may be considered a declined skill for the course and no longer a candidate skill for the course.

Also, in some embodiments, if a skill is confirmed for a course, the user may employ a user interface control such as skill proficiency selector 618, or the like, to assign a proficiency score to the confirmed skill. In some embodiments, proficiency scores may be assigned based on one or more conventional proficiency taxonomies, such as Bloom's Taxonomy. Note, in some embodiments, skills engines may be arranged to determine the particular taxonomy for declaring proficiency via configuration information to account for local circumstances or local requirements.

Further, in this example, if the scorer is finished with a particular skill, they may select a user interface control such as next button 620 to advance to the next skill. Or, in some cases, if all the candidate skills have been resolved, user interface 600 may be arranged to display skill confirmation user interface for a next course that may be assigned to the same scorer.

Accordingly, in some embodiments, user interface 600 enables scorers to rapidly confirm or deny skills that may be taught by courses and declare the skill proficiency taught for each confirmed skill.

In one or more of the various embodiments, skills engines may be arranged to generate additional user interfaces (not shown) that enable administrators to assign courses to qualified users. For example, an institution administrator may assign courses to professors or teaching assistants that teach the course. Accordingly, individuals that are familiar with how the course is taught and the skills gained by students may be the users that confirm or deny skills or skill proficiency for a given course.

Generalized Operations

Figure 7:
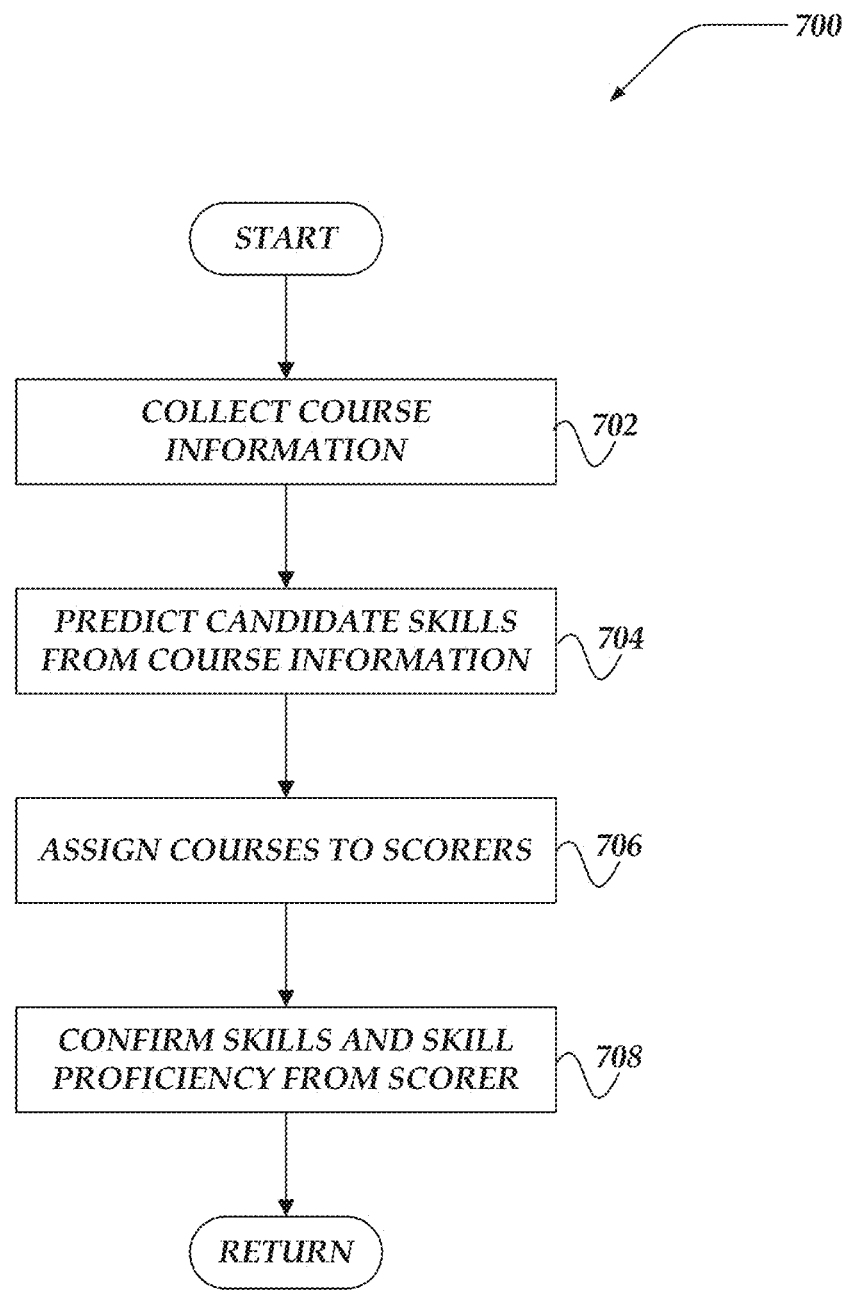
FIG. 7 illustrates an overview flowchart for a process for confirming skills and proficiency in course offerings in accordance with one or more of the various embodiments.
Figure 8:
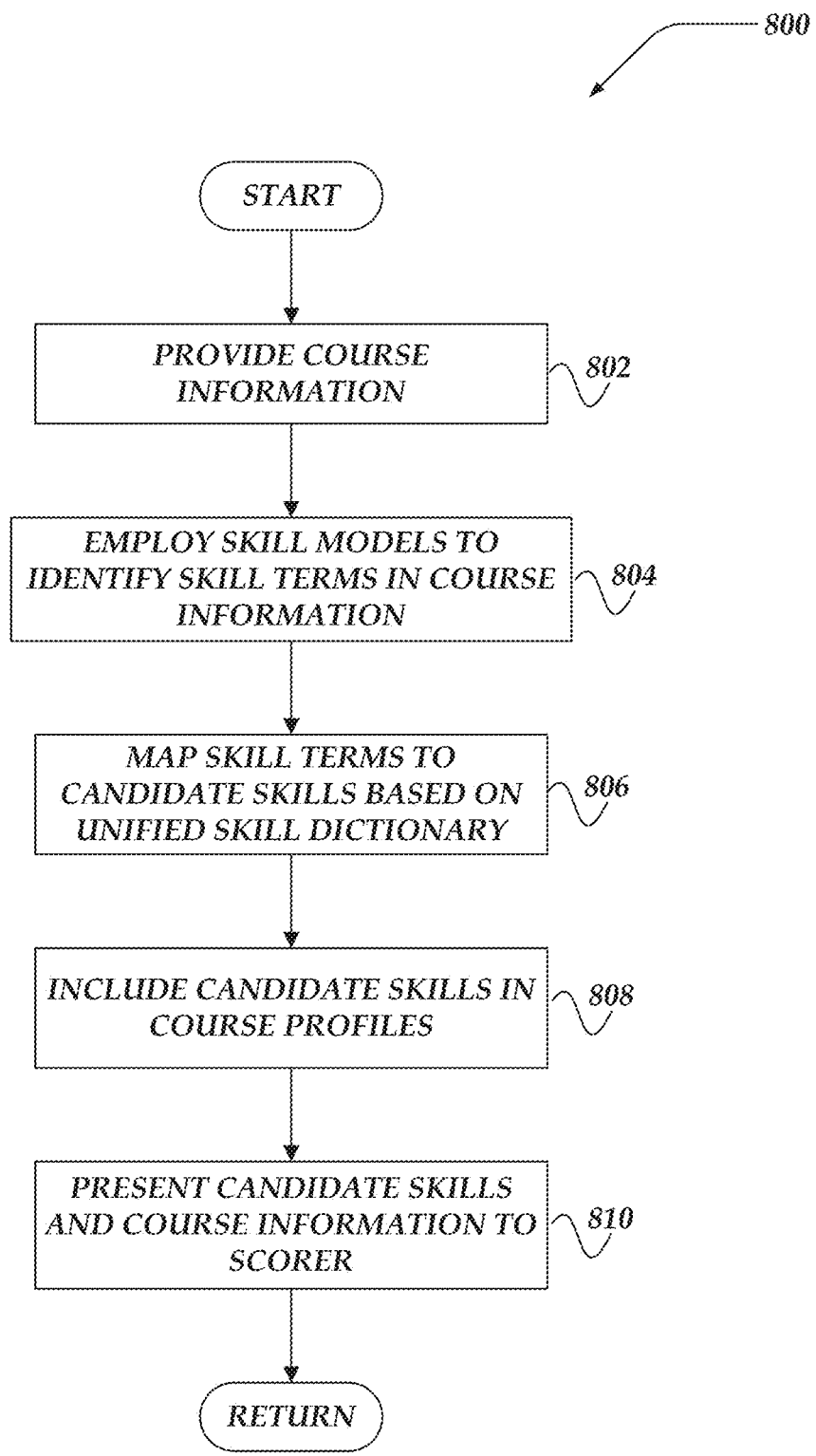
FIG. 8 illustrates a flowchart for a process for confirming skills and proficiency in course offerings in accordance with one or more of the various embodiments.
Figure 9:
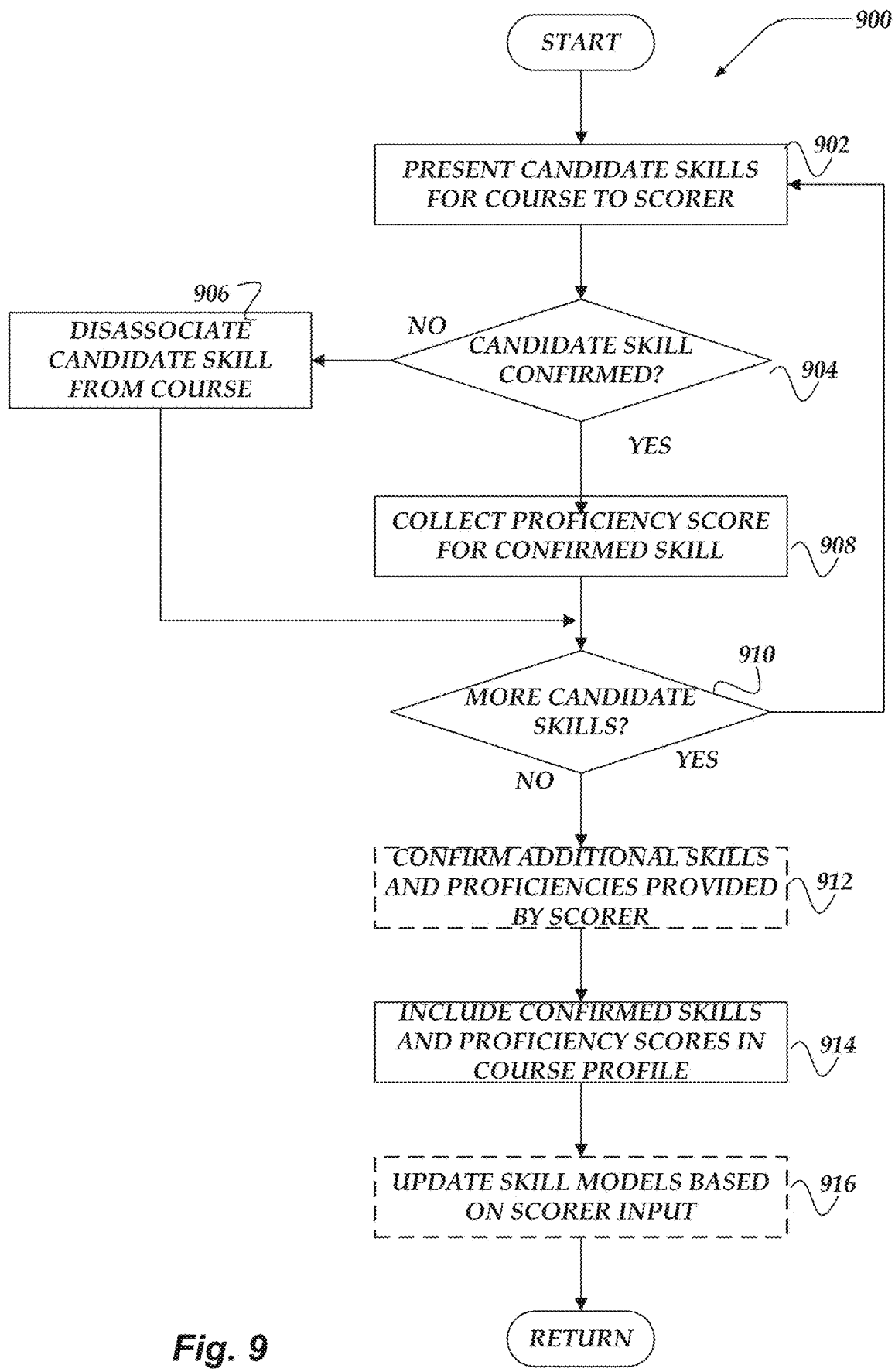
FIG. 9 illustrates a flowchart for a process for confirming skills and proficiency in course offerings in accordance with one or more of the various embodiments.

FIGS. 7-9 represent generalized operations for confirming skills and proficiency in course offerings in accordance with one or more of the various embodiments. In one or more of the various embodiments, processes 700, 800, and 900 described in conjunction with FIGS. 7-9 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may perform actions for confirming skills and proficiency in course offerings in accordance with at least one of the various embodiments or architectures such as those described in conjunction with FIGS. 4-6. Further, in one or more of the various embodiments, some or all of the actions performed by processes 700, 800, and 900 may be executed in part by skills engine 322, or the like.

FIG. 7 illustrates an overview flowchart for process 700 for confirming skills and proficiency in course offerings in accordance with one or more of the various embodiments. After a start block, at block 702, in one or more of the various embodiments, skills engines may be arranged to collect course information. As described above, course information may be collected from a variety of public or private sources, including the educational institution that may be offering the courses of interest. In some embodiments, course information that may be available to skills engines may be stored in one or more data stores or databases that skills engines may be enabled access.

At block 704, in one or more of the various embodiments, skills engines may be arranged to predict one or more candidate skills from the course information. In one or more of the various embodiments, skills engines may be arranged to employ one or more skill models to identify skill terms in course information and map those skill terms to one or more unified skills. In some embodiments, unified skills may be a set of skills included a unified skill dictionary. In some embodiments, the particular skill definitions and their labels may vary depending on local circumstance or local requirements. In some embodiments, some or all skills in the unified skill dictionary may be determined or defined based on one or more sources, such as, industry standards, government classifications, local requirements, or the like. Accordingly, in some cases, some or all of the skills included in unified skill dictionaries may be provided via configuration information.

In one or more of the various embodiments, skills engines may be arranged to automatically determine one or more candidate skills for each evaluated course. In some embodiments, skills engines may be arranged to generate or maintain course profiles that may include the candidate skills that may be determined for a given course.

At block 706, in one or more of the various embodiments, skills engines may enable one or more administrator to assign one or more courses to one or more scorers. As described above, scorers may be users with subject matter expertise that qualifies them to determine the skills that may be learned from individual courses. For example, instructors, professors, teaching assistants, or the like, that are familiar with a course may be assigned to confirm the skills that may be learned in a course. In some cases, for some embodiments, a same scorer may be assigned one or more courses at the same time.

At block 708, in one or more of the various embodiments, skills engines may be arranged to confirm skills and skill proficiency for the one or more assigned courses. In some embodiments, skills engines may be arranged to provide user interfaces that enable scorers to confirm skills and proficiency scores for one or more courses that have been assigned to them. Accordingly, in some embodiments, if scorers access skills engine user interfaces, they may be presented with information such as, course summaries, candidate skills, or the like, of the courses that have been assigned to them.

Accordingly, in some embodiments, skills engines may be arranged to collect skill confirmation information and proficiency scores provided by scorers. In some embodiments, skills engines may be arranged to update the corresponding course profiles based on skill confirmations and proficiency scores provided by scorers. Also, in some embodiments, skills engines may be arranged to update, score, modify, or retrain one or more skill models based on the skill confirmations and the proficiency scores provided by one or more scorers.

Next, in one or more of the various embodiments, control may be returned to a calling process.

FIG. 8 illustrates a flowchart for process 800 for confirming skills and proficiency in course offerings in accordance with one or more of the various embodiments. After a start block, at block 802, in one or more of the various embodiments, skills engines may be provided course information for a course. As described above, course information may be provided from a variety of sources in various formats. For example, course information may be course syllabuses, course catalog descriptions, or other public or private sources of information about courses.

At block 804, in one or more of the various embodiments, skills engines may be arranged to employ one or more skill models to identify skill terms in the course information. In one or more of the various embodiments, skills engines may be arranged to employ one or more skill models to identity terms included the course information that may be associated with various skill. As described above, one or more skill models may be configured to identify words or phrases based on machine learning classifications, natural language processing, pattern matching, or the like, that may be consider skill terms for one or more skills in the unified skill dictionary. In some embodiments, raw course information may be pre-processed (e.g., data cleaning) before submitting to skill models. Likewise, in some embodiments, depending on the type of model or type of course information one or more particular skill models may require different pre-processing/formatting than others. For example, some skill models that employ NLP may process raw course information to remove stop words or normalize the text before being submitted to NLP-based skill models.

At block 806, in one or more of the various embodiments, skills engines may be arranged to map the one or more skill terms to candidate skills based on unified skill dictionary.

In one or more of the various embodiments, skills engines may be arranged to employ a unified skill dictionary representing skills that may be identified from course information. In some embodiments, skills engines may be arranged to categorize skills into one or more categories, such as, hard skills, technical skill, soft skills, life skills, or the like. In some embodiments, skill categories may vary depending local circumstances or local requirements. Likewise, in some embodiments, some skills may overlap one or more other skills, in that the same set of skill terms may map to two or more skills. Also, as mentioned above, one or more skills may be hierarchically related such that mapping skill terms to a narrow/specific skill may automatically result in broader/wide-scope skills being associated with the course as well.

At block 808, in one or more of the various embodiments, skills engines may be arranged to include the one or more candidate skills in a course profile. In some embodiments, skills determined by the skill models may be considered candidate skills until they may be confirmed by a scorer. Accordingly, in some embodiments, candidate skills may be associated with courses using course profiles. As described herein, course profiles may be one or more data structures arranged to represent information about individual courses.

At block 810, in one or more of the various embodiments, skills engines may be arranged to present the one or more candidate skills and a summary of the course information to a designated scorer. In one or more of the various embodiments, skills engines may be arranged to generate user interfaces that enable subject matter experts to evaluate the candidate skills and indicate which skills should be confirmed as well as provide proficiency scores for the confirmed skills.

Note, in some embodiments, skills engines may be arranged to process course information to determine candidate skills and store the results until a scorer has the opportunity to confirm/evaluate the candidate skills. As described above, an administrator user may be enables to assign one or more courses to available scorers. Thus, in some embodiments, if a scorer accesses the skills engine user interfaces, the courses that have been previously assigned to them may be made available to them for evaluation.

Thus, in some embodiments, skills engines may be arranged to process multiple courses (e.g., batch processing) before engaging scorers to confirm skills and proficiencies.

Next, in one or more of the various embodiments, control may be returned to a calling process.

FIG. 9 illustrates a flowchart for process 900 for confirming skills and proficiency in course offerings in accordance with one or more of the various embodiments. After a start block, at block 902, in one or more of the various embodiments, skills engines may be arranged to present candidate skills associated with a course to a scorer. As described above, skills engines may employ skill models to associate the one or more candidate skills for the one or more courses. In some embodiments, skills engines may be arranged to generate a user interface that includes a summary of course information for a course along with the one or more candidate skills associated with that course. Accordingly, in some embodiments, the user interface may be presented to a scorer.

At decision block 904, in one or more of the various embodiments, if the scorer confirms the candidate skill, control may flow to block 908; otherwise, control may flow to block 906.

In one or more of the various embodiments, the user interface generated by the skills engine may enable scorers to confirm if the one or more candidate skills are taught/learned in the course. Likewise, in some embodiments, scorers may be enabled to indicated that a candidate skill subject is not taught/learned from the course.

At block 906, in one or more of the various embodiments, skills engines may be arranged to disassociate declined candidate skills from course. In one or more of the various embodiments, candidate skills that may be rejected by the scorers may be discarded or otherwise removed from association with the course. In some embodiments, skills engines may be arranged to track which skills were proposed as candidate skill and then later rejected for a given course. Accordingly, in some embodiments, this information may be employed to evaluate the Skill models that suggested that proposed the candidate skills in the first place.

Next, control may flow to decision block 910.

At block 908, in one or more of the various embodiments, skills engines may be arranged to collect a proficiency score for the confirmed skill. As described above, skills engines may be arranged to provide a user interface that enables scorers to assign a proficiency score to the confirmed skill. In some embodiments, proficiency scores may be based on one or more conventional tautological standards or frameworks, such as, Bloom's Taxonomy, or the like. Further, in some embodiments, skills engines may be arranged to enable to scorers to assign proficiency scores that may be based on one or more other standards, conventions, custom scoring, or the like. Accordingly, in some embodiments, skills engines may be arranged to determine the particular scoring standard based on rules, templates, instructions, or the like, provided via configuration information to account for local circumstances or local requirements.

At decision block 910, in one or more of the various embodiments, if there may be more candidate skills to evaluate, control may loop back to block 902; otherwise, control may flow to block 912. As described above, courses may be associated with one or more candidate skills depending on the particular course. Accordingly, in some embodiments, skills engines may be arranged to enable scorers to address each candidate score for the course before moving on. In some cases, for some embodiments, a scorer may be assigned more than one course. If so, in some embodiments, skills engines may be arranged to display another user interface that may include summary course information and candidate skills for a next assigned course.

At block 912, in one or more of the various embodiments, optionally, skills engines may be arranged to confirm one or more skills that may be provided by the scorer. In some embodiments, skills engines may be arranged to enable scorers to add one or more confirmed skills that were not otherwise included as candidate skills. Accordingly, in some embodiments, skills engines may enable scorers to include taught/learned skills that may not be referenced in the source course information. Likewise, in some embodiments, scorers may be enabled to add skills that may have been missed by the skill models that evaluated the source course information.

In some embodiments, if scorers add additional confirmed skills, skills engines may be arranged to collect proficiency scores for the added confirmed skills.

Note, this block is indicated as being optional because in some cases scorers may not be enabled to add additional skills or scorers may choose to not include additional skills.

At block 914, in one or more of the various embodiments, skills engines may be arranged to include confirmed skills and proficiency scores in course profile. In some embodiments, as described above, skills engines may be arranged to generate or maintain one or more data structures that may be employed to associate skill information (among other things) with courses. Accordingly, in some embodiments, skills engines may be arranged to update or generate course profiles based on scoring results. For example, if scorers confirm candidate skills and provide proficiency scores for the confirmed skill, skills engines may be arranged to include this information in the course profile. In some embodiments, course profiles may include references to the confirmed courses, proficiency scores, or the like. Likewise, in some embodiments, course profiles may embed skill listings or proficiency scores in the course profile data structures themselves.

At block 916, in one or more of the various embodiments, optionally, skills engines may be arranged to update one or more skill models based on the scoring. In some embodiments, scoring information may be employed to retrain skill models, score/grade skill models, or the like. Also, in some embodiments, skills engines may be arranged to employ skill model grades to rank skill models. Likewise, in some embodiments, skills engines may be arranged to discard/disable one or more skill models that accumulate scores/grades that fall below a defined threshold value.

For example, for some embodiments, skills engines may be arranged to de-rank, de-prioritize, discard, or retrain skill models that may be observed proposing too many candidate skills that are rejected by scorers. Accordingly, for example, in some embodiments, skills engines may be arranged to flag Skill models for de-ranking, de-prioritization, discarding, or retraining if the ratio of rejected candidate skills versus confirm candidate skills exceeds a threshold value. In some embodiments, skills engines may be arranged to employ rules, instructions, threshold values, or the like, provided via configuration information to determine if skills models may be de-ranked, de-prioritized, discarded, or retrained.

Note, this block is indicated as being optional because in some embodiments skill models may not be automatically selected for de-ranking, de-prioritization, discarding, or retraining.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is new and desired to be protected by Letter Patent of the United States is:

1. A method of managing courses over a network using one or more processors that are configured to execute instructions, wherein the execution of the instructions causes performance of actions, comprising:

providing course information for a course based on one or more of a course syllabus, a course catalog, or a course description;

determining one or more skill terms for the course based on the course information and one or more skill models that are machine learning models and one or more of a local circumstance or a local requirement, wherein one or more skills are categorized as soft skills or technical skills for the one or more skill terms;

determining one or more skill terms for the course that map to one or more hierarchical skill elements for one or more skill vectors associated with the course;

determining one or more candidate skills based on a unified dictionary and the one or more skill terms mapped to the one or more candidate skills and the one or more hierarchical skill elements of each skill vector that is associated with the course, wherein one or more soft skills or one or more technical skills are determined for the one or more candidate skills;

displaying, in a user interface, a summary generated for the course information that is relevant to a subject matter expert that is determined to be qualified to confirm skills and proficiency for the course in an information panel, a first display panel showing the one or more soft skills and a second display panel showing the one or more technical skills, wherein the information panel includes one or more links to a source of the course information for the subject matter expert;

employing geolocation information to select localization information to determine localization features for display by one of a browser or a client application in the user interface and use by one or more internal processes and internal databases, wherein the localization features include time zones, languages, currencies, and calendar formats;

in response to selection of one or more of a soft skill in the first display panel or a technical skill in the second display panel, performing further actions, including:

generating a first dialogue box associated with each selected soft skill, wherein the first dialogue box generates one or more controls for the subject matter expert to input one of confirmation or rejection of the selected soft skill and input one or more proficiency levels values associated with each confirmed soft skill;

generating a second dialogue box associated with each selected technical skill, wherein the second dialogue box generates one or more controls for the subject matter expert to input one of confirmation or rejection of the selected technical skill and input one or more proficiency levels values associated with each confirmed technical skill;

determining a proficiency score for each of the one or more confirmed technical or soft skills based on the one or more proficiency levels inputted by the subject matter expert, a particular taxonomy determined by configuration information, and the one or more of the local circumstance or the local requirement;

employing scoring information to generate one or more grades for the one or more skill models, wherein each grade associated with a skill model that is below a threshold is used for retraining of the skill model based on one or more skill confirmations and one or more proficiency scores;

flagging each of the one or more skill models associated with an amount of the one or more of the soft skills or the one or more of the technical skills determined for the one or more candidate skills that is rejected by the subject matter expert and also greater than another amount of the one or more of the soft skills or the one or more of the technical skills determined for the one or more candidate skills that are confirmed by the subject matter expert, wherein each flagged skill model is automatically arranged for one or more of de-ranking, de-prioritizing, discarding or retraining based on confirmation or rejection for the one or more soft skills or the one or more technical skills; and generating a course profile for the course that includes the confirmed candidate skills and the determined proficiency scores; and in response to the input of the subject matter expert rejecting the one or more of the soft skills or the one or more of the technical skills determined for the candidate skill that is omitted from the course, disassociating the omitted candidate skill from the course; and generating a report based on the course profile, wherein the report includes one or more confirmed soft skills and technical skills and a proficiency score for each confirmed soft skill and each confirmed technical skill for the one or more candidate skills.

2. The method of claim 1, wherein determining the proficiency score, further comprises:

determining a range of proficiency levels for the one or more soft skills and the one or more technical skills based on a classification of educational learning objectives into levels of complexity and specificity;

employing the user interface to display the range of proficiency levels to the subject matter expert; and determining the proficiency score for each of the one or more confirmed soft skills and confirmed technical skills based on each proficiency level selected by the subject matter expert.

3. The method of claim 2, wherein the range of proficiency levels is based on Bloom's Taxonomy.

4. The method of claim 1, wherein determining the one or more candidate skills, further comprises:

categorizing the one or more soft skills based on the one or more skill terms, wherein the one or more soft skills are associated with one or more of communication, collaboration, leadership, problem solving, public speaking, listening, social skills, or negotiation;

categorizing the one or more technical skills based on the one or more skill terms, wherein the one or more technical skills are associated with one or more of an engineering discipline, a data science discipline, a computer science discipline, a health care discipline, a business administration discipline, a sales or marketing discipline, or a finance industry discipline; and displaying the one or more candidate skills in the user interface as a group of the one or more soft skills and another group of the one or more technical skills.

5. The method of claim 1, further comprising, employing the user interface for the subject matter expert to declare one or more additional skills that are also taught by the course; and including the one or more additional skills in the course profile.

6. The method of claim 1, further comprising:

providing a plurality of courses and a plurality of course information based on course offerings corresponding to an educational organization; and assigning one or more courses to one or more subject matter experts based on an assigned subject matter expert having prior experience teaching the one or more courses.

7. A processor readable non-transitory storage media that includes instructions for managing courses over a network, wherein execution of the instructions by one or more processors causes performance of actions, comprising:
provinding course information for a course based on one or more of a course syllabus, a course catalog, or a course description;
determining one or more skill terms for the course based on the course information and one or more skill models that are machine learning models and one or more of a local circumstance or a local requirement, wherein one or more skills are categorized as soft skills or technical skills for the one or more skill terms;
determining one or more skill terms for the course that map to one or more hierarchical skill elements for one or more skill vectors associated with the course;
determining one or more candidate skills based on a unified dictionary and the one or more skill terms mapped to the one or more candidate skills and the one or more hierarchical skill elements of each skill vector that is associated with the course, wherein one or more soft skills or one or more technical skills are determined for the one or more candidate skills;
displaying, in a user interface, a summary generated for the course information that is relevant to a subject matter expert that is determined to be qualified to confirm skills and proficiency for the course in an information panel, a first display panel showing the one or more soft skills and a second display panel showing the one or more technical skills, wherein the information panel includes one or more links to a source of the course information for the subject matter expert;
employing geolocation information to select localization information to determine localization features for display by one of a browser or a client application in the user interface and use by one or more internal processes and internal databases, wherein the localization features include time zones, languages, currencies, and calendar formats;
in response to selection of one or more of a soft skill in the first display panel or a technical skill in the second display panel, performing further actions, including:
generating a first dialogue box associated with each selected soft skill, wherein the first dialogue box generates one or more controls for the subject matter expert to input one of confirmation or rejection of the selected soft skill and input one or more proficiency levels associated with each confirmed soft skill;
generating a second dialogue box associated with each selected technical skill, wherein the second dialogue box generates one or more controls for the subject matter expert to input one of confirmation or rejection of the selected technical skill and input one or more proficiency levels associated with each confirmed technical skill;
determining a proficiency score for each of the one or more confirmed technical or soft skills based on the one or more proficiency levels inputted by the subject matter expert, a particular taxonomy determined by configuration information, and the one or more of the local circumstance or the local requirement;
employing scoring information to generate one or more grades for the one or more skill models, wherein each grade associated with a skill model that is below a threshold is used for retraining of the skill model based on one or more skill confirmations and one or more proficiency scores;
flagging each of the one or more skill models associated with an amount of the one or more of the soft skills or the one or more of the technical skills determined for the one or more candidate skills that is rejected by the subject matter expert and also greater than another amount of the one or more of the soft skills or the one or more of the technical skills determined for the one or more candidate skills that are confirmed by the subject matter expert, wherein each flagged skill model is automatically arranged for one or more of de-ranking, de-prioritizing, discarding or retraining based on confirmation or rejection for the one or more soft skills or the one or more technical skills; and
generating a course profile for the course that includes the confirmed candidate skills and the determined proficiency scores; and
in response to the input of the subject matter expert rejecting the one or more of the soft skills or the one or more of the technical skills determined for the candidate skill that is omitted from the course, disassociating the omitted candidate skill from the course; and
generating a report based on the course profile, wherein the report includes one or more confirmed soft skills and technical skills and a proficiency score for each confirmed soft skill and each confirmed technical skill for the one or more candidate skills.

8. The media of claim 7, wherein determining the proficiency score, further comprises:
determining a range of proficiency levels for the one or more soft skills and the one or more technical skills based on a classification of educational learning objectives into levels of complexity and specificity;
employing the user interface to display the range of proficiency levels to the subject matter expert; and
determining the proficiency score for each of the one or more confirmed soft skills and confirmed technical skills based on each proficiency level selected by the subject matter expert.

9. The media of claim 8, wherein the range of proficiency levels is based on Bloom's Taxonomy.

10. The media of claim 7, wherein determining the one or more candidate skills, further comprises:
categorizing the one or more soft skills based on the one or more skill terms, wherein the one or more soft skills are associated with one or more of communication, collaboration, leadership, problem solving, public speaking, listening, social skills, or negotiation;
categorizing the one or more technical skills based on the one or more skill terms, wherein the one or more technical skills are associated with one or more of an engineering discipline, a data science discipline, a computer science discipline, a health care discipline, a business administration discipline, a sales or marketing discipline, or a finance industry discipline; and
displaying the one or more candidate skills in the user interface as a group of the one or more soft skills and another group of the one or more technical skills.

11. The media of claim 7, further comprising,
employing the user interface for the subject matter expert to declare one or more additional skills that are also taught by the course; and including the one or more additional skills in the course profile.

12. The media of claim 7, further comprising:
providing a plurality of courses and a plurality of course information based on course offerings corresponding to an educational organization; and
assigning one or more courses to one or more subject matter experts based on an assigned subject matter expert having prior experience teaching the one or more courses.

13. A system for managing courses over a network, comprising:
a network computer, comprising:
a memory that stores at least instructions; and
one or more processors that execute instructions that perform actions, including:
providing course information for a course based on one or more of a course syllabus, a course catalog, or a course description;
determining one or more skill terms for the course based on the course information and one or more skill models that are machine learning models and one or more of a local circumstance or a local requirement, wherein one or more skills are categorized as soft skills or technical skills for the one or more skill terms;
determining one or more skill terms for the course that map to one or more hierarchical skill elements for one or more skill vectors associated with the course;
determining one or more candidate skills based on a unified dictionary and the one or more skill terms mapped to the one or more candidate skills and the one or more hierarchical skill elements of each skill vector that is associated with the course, wherein one or more soft skills or one or more technical skills are determined for the one or more candidate skills;
displaying, in a user interface, a summary generated for the course information that is relevant to a subject matter expert that is determined to be qualified to confirm skills and proficiency for the course in an information panel, a first display panel showing the one or more soft skills and a second display panel showing the one or more technical skills, wherein the information panel includes one or more links to a source of the course information for the subject matter expert;
employing geolocation information to select localization information to determine localization features for display by one of a browser or a client application in the user interface and use by one or more internal processes and internal databases, wherein the localization features include time zones, languages, currencies, and calendar formats;
in response to selection of one or more of a soft skill in the first display panel or a technical skill in the second display panel, performing further actions, including:
generating a first dialogue box associated with each selected soft skill, wherein the first dialogue box generates one or more controls for the subject matter expert to input one of confirmation or rejection of the selected soft skill and input one or more proficiency levels associated with each confirmed soft skill;
generating a second dialogue box associated with each selected technical skill, wherein the second dialogue box generates one or more controls for the subject matter expert to input one of confirmation or rejection of the selected technical skill and input one or more proficiency levels associated with each confirmed technical skill;
determining a proficiency score for each of the one or more confirmed technical or soft skills based on the one or more proficiency levels inputted by the subject matter expert, a particular taxonomy determined by configuration information, and the one or more of the local circumstance or the local requirement;
employing scoring information to generate one or more grades for the one or more skill models, wherein each grade associated with a skill model that is below a threshold is used for retraining of the skill model based on one or more skill confirmations and one or more proficiency scores;
flagging each of the one or more skill models associated with an amount of the one or more of the soft skills or the one or more of the technical skills determined for the one or more candidate skills that is rejected by the subject matter expert and also greater than another amount of the one or more of the soft skills or the one or more of the technical skills determined for the one or more candidate skills that are confirmed by the subject matter expert, wherein each flagged skill model is automatically arranged for one or more of de-ranking, de-prioritizing, discarding or retraining based on confirmation or rejection for the one or more soft skills or the one or more technical skills; and
generating a course profile for the course that includes the confirmed candidate skills and the determined proficiency scores; and
in response to the input of the subject matter expert rejecting the one or more of the soft skills or the one or more of the technical skills determined for the candidate skill that is omitted from the course, disassociating the omitted candidate skill from the course; and
generating a report based on the course profile, wherein the report includes one or more confirmed soft skills and technical skills and a proficiency score for each confirmed soft skill and each confirmed technical skill for the one or more candidate skills; and
a client computer, comprising:
a memory that stores at least instructions; and
one or more processors that execute instructions that enable performance of actions, including:
displaying the report on a hardware display.

14. The system of claim 13, wherein determining the proficiency score, further comprises:
determining a range of proficiency levels for the one or more soft skills and the one or more technical skills based on a classification of educational learning objectives into levels of complexity and specificity;
employing the user interface to display the range of proficiency levels to the subject matter expert; and determining the proficiency score for each of the one or more confirmed soft skills and confirmed technical skills based on each proficiency level selected by the subject matter expert.

15. The system of claim 14, wherein the range of proficiency levels is based on Bloom's Taxonomy.

16. The system of claim 13, wherein determining the one or more candidate skills, further comprises:
   categorizing the one or more soft skills based on the one or more skill terms, wherein the one or more soft skills are associated with one or more of communication, collaboration, leadership, problem solving, public speaking, listening, social skills, or negotiation;
   categorizing the one or more technical skills based on the one or more skill terms, wherein the one or more technical skills are associated with one or more of an engineering discipline, a data science discipline, a computer science discipline, a health care discipline, a business administration discipline, a sales or marketing discipline, or a finance industry discipline; and
   displaying the one or more candidate skills in the user interface as a group of the one or more soft skills and another group of the one or more technical skills.

17. The system of claim 13, wherein the one or more network computer processors execute instructions that perform actions, further comprising:
further comprising,
   employing the user interface for the subject matter expert to declare one or more additional skills that are also taught by the course; and
   including the one or more additional skills in the course profile.

18. The system of claim 13, wherein the one or more network computer processors execute instructions that perform actions, further comprising:
further comprising:
   providing a plurality of courses and a plurality of course information based on course offerings corresponding to an educational organization; and
   assigning one or more courses to one or more subject matter experts based on an assigned subject matter expert having prior experience teaching the one or more courses.

19. A network computer for managing courses over a network, comprising:
   a memory that stores at least instructions; and
   one or more processors that execute instructions that enable performance of actions, including:
      providing course information for a course based on one or more of a course syllabus, a course catalog, or a course description;
      determining one or more skill terms for the course based on the course information and one or more skill models that are machine learning models and one or more of a local circumstance or a local requirement, wherein one or more skills are categorized as soft skills or technical skills for the one or more skill terms;
      determining one or more skill terms for the course that map to one or more hierarchical skill elements for one or more skill vectors associated with the course;
      determining one or more candidate skills based on a unified dictionary and the one or more skill terms mapped to the one or more candidate skills and the one or more hierarchical skill elements of each skill vector that is associated with the course, wherein one or more soft skills or one or more technical skills are determined for the one or more candidate skills;
      displaying, in a user interface, a summary generated for the course information that is relevant to a subject matter expert that is determined to be qualified to confirm skills and proficiency for the course in an information panel, a first display panel showing the one or more soft skills and a second display panel showing the one or more technical skills, wherein the information panel includes one or more links to a source of the course information for the subject matter expert;
      employing geolocation information to select localization information to determine localization features for display by one of a browser or a client application in the user interface and use by one or more internal processes and internal databases, wherein the localization features include time zones, languages, currencies, and calendar formats;
      in response to selection of one or more of a soft skill in the first display panel or a technical skill in the second display panel, performing further actions, including:
         generating a first dialogue box associated with each selected soft skill, wherein the first dialogue box generates one or more controls for the subject matter expert to input one of confirmation or rejection of the selected soft skill and input one or more proficiency levels associated with each confirmed soft skill;
         generating a second dialogue box associated with each selected technical skill, wherein the second dialogue box generates one or more controls for the subject matter expert to input one of confirmation or rejection of the selected technical skill and input one or more proficiency levels associated with each confirmed technical skill;
         determining a proficiency score for each of the one or more confirmed technical or soft skills based on the one or more proficiency levels inputted by the subject matter expert, a particular taxonomy determined by configuration information, and the one or more of the local circumstance or the local requirement;
         employing scoring information to generate one or more grades for the one or more skill models, wherein each grade associated with a skill model that is below a threshold is used for retraining of the skill model based on one or more skill confirmations and one or more proficiency scores;
         flagging each of the one or more skill models associated with an amount of the one or more of the soft skills or the one or more of the technical skills determined for the one or more candidate skills that is rejected by the subject matter expert and also greater than another amount of the one or more of the soft skills or the one or more of the technical skills determined for the one or more candidate skills that are confirmed by the subject matter expert, wherein each flagged skill model is automatically arranged for one or more of de-ranking, de-prioritizing, discarding or retraining based on confirmation or rejection for the one or more soft skills or the one or more technical skills; and generating a course profile for the course that includes the confirmed candidate skills and the determined proficiency scores; and in response to the input of the subject matter expert rejecting the one or more of the soft skills or the one or more of the technical skills determined for the candidate skill that is omitted from the course, disassociating the omitted candidate skill from the course; and generating a report based on the course profile, wherein the report includes one or more confirmed soft skills and technical skills and a proficiency score for each confirmed soft skill and each confirmed technical skill for the one or more candidate skills.

20. The network computer of claim 19, wherein determining the proficiency score, further comprises:

determining a range of proficiency levels for the one or more soft skills and the one or more technical skills based on a classification of educational learning objectives into levels of complexity and specificity;

employing the user interface to display the range of proficiency levels to the subject matter expert; and determining the proficiency score for each of the one or more confirmed soft skills and confirmed technical skills based on each proficiency level selected by the subject matter expert.

21. The network computer of claim 20, wherein the range of proficiency levels is based on Bloom's Taxonomy.

22. The network computer of claim 19, wherein determining the one or more candidate skills, further comprises:

categorizing the one or more soft skills based on the one or more skill terms, wherein the one or more soft skills are associated with one or more of communication, collaboration, leadership, problem solving, public speaking, listening, social skills, or negotiation;

categorizing the one or more hard technical skills based on the one or more skill terms, wherein the one or more technical skills are associated with one or more of an engineering discipline, a data science discipline, a computer science discipline, a health care discipline, a business administration discipline, a sales or marketing discipline, or a finance industry discipline; and displaying the one or more candidate skills in the user interface as a group of the one or more soft skills and another group of the one or more technical skills.

23. The network computer of claim 19, wherein the one or more processors execute instructions that perform actions, further comprising:

employing the user interface for the subject matter expert to declare one or more additional skills that are also taught by the course; and including the one or more additional skills in the course profile.

24. The network computer of claim 19, wherein the one or more processors execute instructions that perform actions, further comprising:

providing a plurality of courses and a plurality of course information based on course offerings corresponding to an educational organization; and assigning one or more courses to one or more subject matter experts based on an assigned subject matter expert having prior experience teaching the one or more courses.

* * * * *

UNITED STATES PATENT AND TRADEMARK OFFICE
CERTIFICATE OF CORRECTION

PATENT NO. : 12,248,898 B2
APPLICATION NO. : 17/587413
DATED : March 11, 2025
INVENTOR(S) : Cai et al.

Page 1 of 1

It is certified that error appears in the above-identified patent and that said Letters Patent is hereby corrected as shown below:

In the Claims

In Column 25, Line 44, in Claim 1, delete "levels values" and insert -- levels --, therefor.

In Column 25, Line 51, in Claim 1, delete "levels values" and insert -- levels --, therefor.

In Column 26, Line 58, in Claim 5, delete "comprising," and insert -- comprising: --, therefor.

In Column 28, Line 64, in Claim 11, delete "comprising," and insert -- comprising: --, therefor.

In Column 31, Lines 26-28, in Claim 17, delete "perform actions, further comprising: further comprising," and insert -- perform actions, further comprising: --, therefor.

In Column 31, Lines 35-37, in Claim 18, delete "perform actions, further comprising: further comprising:" and insert -- perform actions, further comprising: --, therefor.

In Column 34, Line 4, in Claim 22, delete "hard technical" and insert -- technical --, therefor Signed and Sealed this
Thirteenth Day of May, 2025

Coke Morgan Stewart
*Acting Director of the United States Patent and Trademark Office*